United States Patent [19]

Segal et al.

[11] 4,051,724

[45] Oct. 4, 1977

[54] FLOW RESPONSIVE COUNTING APPARATUS

[75] Inventors: Jack S. Segal, Park Forest, Ill.; Harold D. Trapp, Dyer, Ind.

[73] Assignee: Atlantic Richfield Company, Philadelphia, Pa.

[21] Appl. No.: 663,176

[22] Filed: Mar. 2, 1976

[51] Int. Cl.² .............................................. G01F 1/00
[52] U.S. Cl. ............................... 73/198; 134/56 R; 134/113; 222/23; 235/94 R; 116/117 R
[58] Field of Search ................... 73/195, 198, 228; 134/45, 46, 56 R, 113; 222/23, 25, 36, 37, 71; 235/94 R; 116/117 R; 137/551, 557

[56] References Cited

U.S. PATENT DOCUMENTS

| | | | |
|---|---|---|---|
| 1,063,255 | 6/1913 | Hanns | 73/228 X |
| 2,427,145 | 9/1947 | Koehler et al. | 128/2.08 |
| 2,647,660 | 8/1953 | Arena | 235/94 |
| 3,057,977 | 10/1962 | Caswell | 73/228 X |
| 3,081,766 | 3/1963 | Dubsky et al. | 128/2.08 |
| 3,233,448 | 2/1966 | Brown | 73/223 X |
| 3,370,750 | 2/1968 | Deutch | 235/94 X |
| 3,627,093 | 12/1971 | Greenwald | 73/228 X |
| 3,924,611 | 12/1975 | Galitsky | 128/2.08 |

*Primary Examiner*—Herbert Goldstein
*Attorney, Agent, or Firm*—John B. Goodman

[57] ABSTRACT

A flow responsive counting apparatus comprising in combination a) conduit means having an inlet and an outlet; b) means mechanically responsive to fluid flow for measuring volumetric flow of water; c) means mechanically responsive to fluid flow for totalling "on-off" water flow cycles; said conduit means interconnecting in series the means for measuring volume flow and means for totalling on-off water flow cycles. The apparatus interconnected in an appropriate water line in an automatic car wash can provide a tamper-resistant means for counting the number of vehicles washed in the automatic car wash.

7 Claims, 4 Drawing Figures

U.S. Patent      Oct. 4, 1977      4,051,724
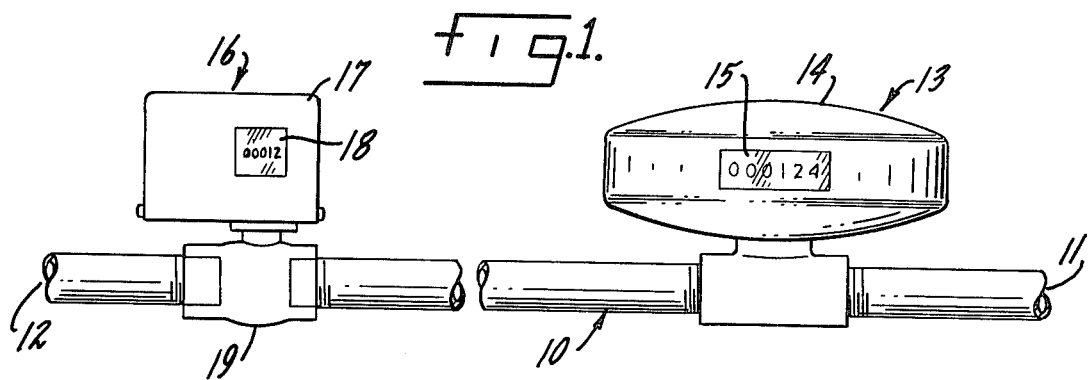
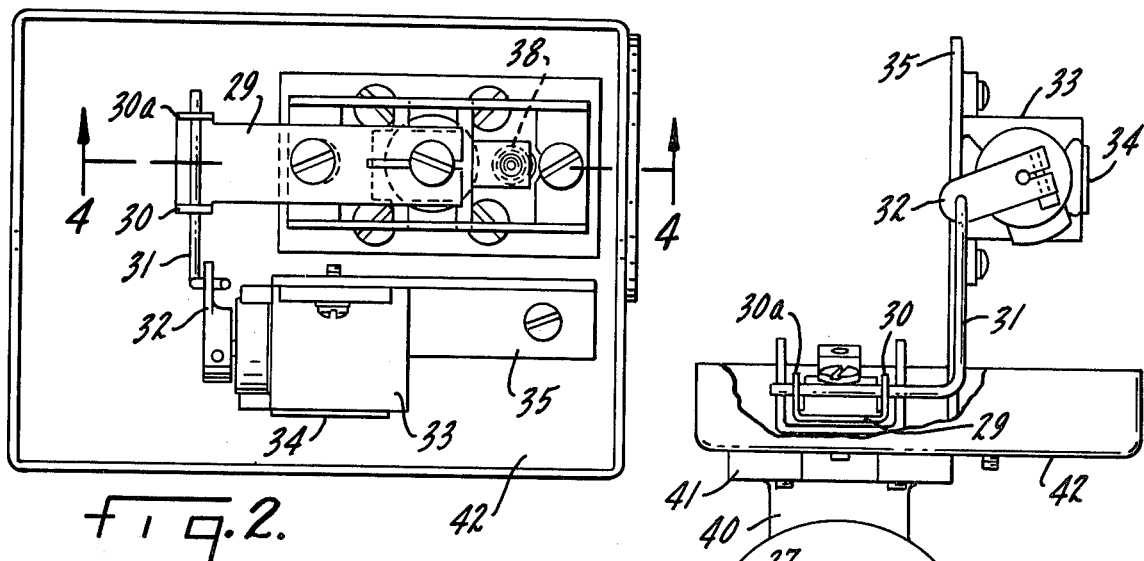
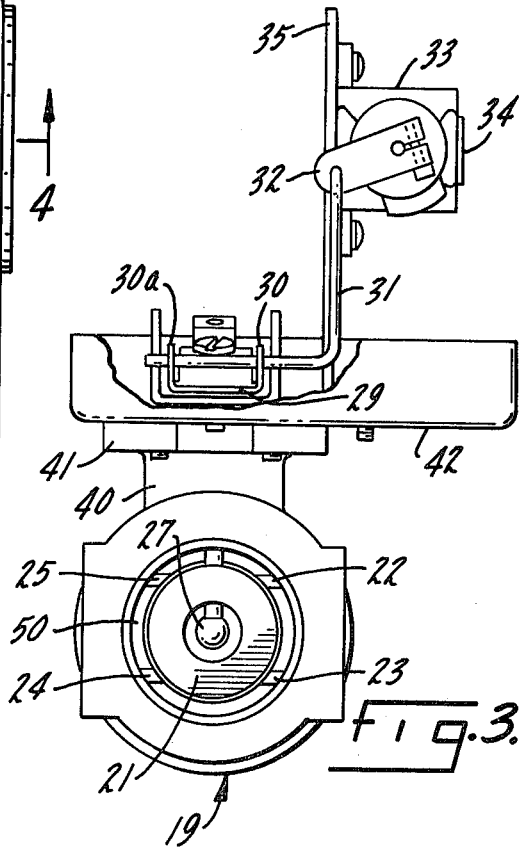
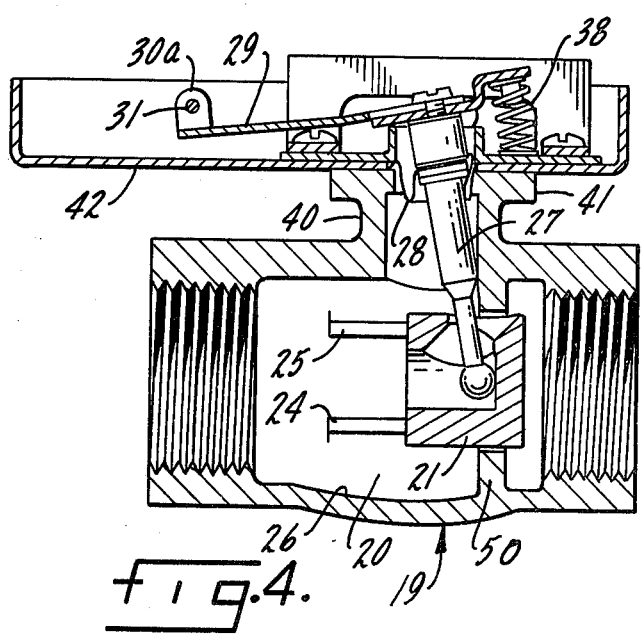

FLOW RESPONSIVE COUNTING APPARATUS

BACKGROUND OF THE INVENTION

The field of this invention relates to a flow responsive counting apparatus suitable for counting the number of vehicles which have been washed in an automatic car wash facility.

As is well known, an automatic car wash facility generally is a facility which allows a vehicle to move to various stations where various washing operations are mechanically performed on the vehicle, for example, pre-rinsing, soaping and rinsing. These operations generally involve the use of flowing water under pressure.

Most automatic car wash facilities have devices for metering the number of vehicles which use the car wash facility. A primary purpose of such devices is to ensure that a car wash operator collecting revenue for use of the car wash turns in to the car wash owner all of the revenue received from customers using the car wash facility. By knowing the number of vehicles which have used the car wash facility, the owner can determine the revenue paid by customers using the car wash facility.

For such a device to be effective, however, it must be accurate, and resistant to tampering. It is important that the device be resistant to tampering; otherwise, it can be manipulated by a dishonest operator.

Heretofore, devices employed for metering car wash usage have been less than satisfactory because they are not sufficiently tamper resistant. The available counting devices have generally employed counting mechanisms which are electrically actuated with the counts being generated by electrical impulses or the closing of an electrical circuit. Such counters are usually activated by one of the following methods: a) a car moves past and closes an electrical switch; b) a car moves past an electrical sensor such as a photocell or metal detector; or c) an electrical impulse is generated when another component in the car wash equipment is activated, e.g., conveyor, blower, etc.

A major problem with electrically operated metering devices is that personnel at the car wash facility can disconnect or override the devices for short periods of time with no evidence of this action having taken place. For example, electrical wires can be disconnected, electrical switches can be by-passed and photocells can be covered with opaque material. The result is that lower counts of cars using the facility can be reported, and less revenue (corresponding to the lower reported count) can be turned in by the operator.

These prior art counting devices or meters can normally be reactivated as easily as they were deactivated. In addition, the disconnecting or overriding of the device does not affect the normal operation of car wash equipment. The result is that there is nothing to indicate that the counting device was deactivated; and, therefore, nothing prevents car wash personnel from taking action to by-pass the counting device if they are so inclined.

There exists a need for an apparatus for counting the number of vehicles washed in an automatic car wash facility which is more tamper resistant. A desirable device would provide accurate counts, would show the effect of tampering and/or would adversely affect car wash operations if disabled or disconnected. Preferably the device would be an integral part of the car wash system.

SUMMARY OF THE INVENTION

This invention provides an apparatus suitable for counting the number of vehicles washed in a commercial car wash comprising in combination
 a. conduit means having an inlet and an outlet;
 b. means mechanically responsive to fluid flow for measuring volumetric flow of water;
 c. means mechanically responsive to fluid flow for totallying "on-off" water flow cycles;
 said conduit means interconnecting in series said means for measuring volume flow and means for totalling on-off water flow cycles.

The apparatus of the invention can be suitably interconnected in a water line supplying water in an automatic car wash operation. For example, the apparatus can be interconnected in a water line supplying water to a rinsing operation. When rinse water is supplied intermittently for each vehicle rinsed, the number of vehicles rinsed is counted. The volume of water is also measured, and a normal volume of water per vehicle rinsed can be determined. If the rinse water is not supplied intermittently for each vehicle rinsed, this will be detected since abnormal volumes of water per vehicle rinsed will be shown.

BRIEF DESCRIPTION OF THE DRAWINGS

FIG. 1 schematically illustrates the combination of the invention.

FIG. 2 is a top view of a preferred assembly for totalling on-off water flow cycles.

FIG. 3 is a left-hand end view of the assembly of FIG. 2.

FIG. 4 is a partial cross-sectional view of FIG. 2 taken across section line 4—4 of FIG. 2.

DETAILED DESCRIPTION OF THE PREFERRED EMBODIMENTS

The combination of the invention is shown schematically in FIG. 1 and includes conduit means 10 with inlet 11 and outlet 12. Conduit means 10 can suitably comprise various lengths of metal pipe joined together. Conduit means 10 has interconnected thereto conventional device 13 mechanically responsive to fluid flow for measuring volumetric flow of water, e.g., a water meter. Suitable conventional water meters are disclosed in "The Way Things Work, " Vol. 1 (Simon and Schuster, 1967) and "Fluid Measurement and Meters," A. Linford (E. & F.N. Spon, 1949). This volumetric measuring device has a protective housing 14 with suitable means 15 for visually displaying measurements corresponding to water volume flow through conduit means 10.

Interconnected in series by conduit 10 with volumetric flow meter 13 is flow meter 16 for counting "on-off" water flow cycles through conduit 10. Flow meter 16 can have a protective housing 17 with suitable means 18 for viewing the meter total.

A preferred flow meter 16 for counting "on-off" water flow cycles comprises a piston yieldable under the pressure of fluid flow operatively associated with a moveable member communicating with the mechanical counter. One embodiment of such a meter is shown in FIGS. 2, 3 and 4. Referring to FIG. 4, such a preferred flow meter can have a barrel member 19 with a cylindrical chamber 20. Barrel member 19 is suitable for joining with other sections of conduit to form a portion of conduit 10. Preferably, barrel 19 has a chimney 40 with flange 41. Secured to flange 41 is support plate 42. Piston 21 is positioned in chamber 20 by bearings 22, 23, 24 and 25 projecting from the chamber wall 26. Preferably, chamber 20 has an annular skirt 50 projecting from chamber wall 26 forming a restricted opening suitable for receiving piston 21. Piston 21 is adapted to receive rod 27 which extends through chimney 40. Gland 28, a flexible water-tight seal formed from a suitable elastomer material, allows rod 27 to moveably extend from chamber 20 without water loss. The top portion of rod 27, extending from chamber 20, is connected to lever 29. The forward end of lever 29 is connected to spring 38 which urges the forward end of lever 29 up from support plate 42. At the rear end of lever 29, pivots 30, 30a are provided.

Referring now to FIGS. 2 and 3, it will be noted that pivots 30, 30a and linkage 31 mechanically transmit movement of lever 29 to arm 32 of a racket drive digital counter 33. Digital counter 33 is secured in spaced relationship to lever 29 on support hinge 35 which is secured to support plate 42. A preferred digital counter is one with a racket drive with stops such that drive shaft actuation through an arc of 40 degrees minimum, 60 maximum, will add one count for each drive shaft actuation. This degree of shaft actuation necessary to register a count can minimize or eliminate counts due to water flow pressure flucuation other than a substantially on-off water flow. Digital counter 33 has indicator 34 for visually displaying total count. Suitable digital counters are the mechnical totalizing counters manufactured by Veeder-Root Company, Hartford, Connecticut, U.S.A.

In operation, the apparatus of the invention is preferably interconnected in the water line supplying the rinse water in an automatic car wash facility. When a vehicle being washed enters the rinse station of the car wash facility, the rinse water is turned "on," i.e., water is allowed to flow under pressure, in order to rinse the vehicle.

As the rinse water flows, the amount of water is measured by water meter 13, and the flow pressure actuates flow meter 16 registering one count. When the rinse is complete, the rinse water is turned "off." In normal operation, the rinse water will be turned on and off for each vehicle rinsed. Flow meter 16 will total the number of on-off water flow cycles and consequently the number of vehicles rinsed in the course of the wash operation.

In the preferred embodiment of the invention described, when the rinse water is turned on (allowed to flow) from a water supply source under pressure, it enters inlet 11 and flows via conduit 10. Water meter 13, mechanically responsive to the flow of water, measures the amount of water flowing through conduit 10.

The pressure of the flowing water actuates flow meter 16 by impinging on piston 21. Piston 21 yields under the pressure of the flowing water and moves in the direction of the water flow. This movement of piston 21 is transmitted to rod 27 which is secured to lever 29 forcing up the pivot end 30, 30a. Linkage 31 connected to pivot end 30, 30a mechanically transmits this movement to arm 32 of a racket drive digital counter moving arm 32 in an upward arc such that one count is registered.

The pressure of continuously flowing water will hold piston 21 back in a restrained position and consequently digital counter arm 32 in an upward position. When water flow ceases, the force holding back piston 21 ceases. With this restraining force removed, spring 38 urges against lever 29 forcing pivots 30, 30a down. This action of lever 29 is transmitted by linkage 31 moving digital arm 32 down. Rod 27 when secured to lever 29, is simultaneously urged against piston 21 moving it forward. When another vehicle is presented for rinsing, water flow resumes. The cycle is repeated, and digital counter 33 registers another count.

Since a car wash user will generally insist that his car be adequately rinsed after washing, it will be difficult or impossible to avoid the rinse function. Therefore, the on-off water flows registered by flow meter 16 should provide an accurate total of the number of cars using the car wash facility.

An operator attempting to lower the flow meter count might let the water constantly avoiding the on-off cycles which the flow meter totals. Such an attempt, however, will be foiled by water meter 13 which will disclose an abnormally high amount of rinse water used per car rinsed.

While it is preferred that the apparatus of this invention be installed in the water supply line serving the rinse function in an automatic car wash, the apparatus could be suitably interconnected with water lines supplying other functions in an automatic car wash to monitor car wash usage.

Water meter 13 and flow meter 16 can, of course, be suitably sealed such that any attempt to tamper with the devices will be disclosed. For example, the meters can be enclosed in protective metal housings which are sealed by welding.

Since the apparatus of the invention is physically interconnected with a water supply line, and is responsive to water flow, it is not easily by-passed. In addition, since the apparatus of the invention does not require an electrical power source to function, it does not present the ready opportunities for disconnecting or overriding that electrical devices present. Suitably interconnected in a water supply line serving an integral function of the car wash operation, the device is tamper resistant and provides accurate counts of vehicles using a car wash facility.

It will be clear to those skilled in the art that the flow responsive counting apparatus of this invention will be useful in other operations involving fluid flow, for example, the apparatus could suitably be used to measure washing machine usage.

While this invention has been described with respect to various specific examples and embodiments, it is to be understood that the invention is not limited thereto and that it can be variously practiced within the scope of the following claims.

The embodiments of the invention in which an exclusive property or privilege is claimed are defined as follows:

1. In a mechanism adapted to perform specified acts on an object, at least one of the acts involving "on-off" flow of liquid under pressure to the object an apparatus for counting the number of transactions comprising in combination a. conduit means having an inlet and an outlet for carrying the liquid to the object;
   b. means mechanically responsive to the liquid flow for measuring volumetric flow of water;
   c. means mechanically responsive to liquid flow for totalling "on-off" water flow cycles, the total being related in a predetermined manner to the number of transactions;

said conduit means interconnecting in series said means for measuring volume flow and means for totalling on-off water flow cycles.

2. The mechanism of claim 1 wherein the means mechanically responsive to liquid flow for totalling on-off water flow cycles is a flow meter comprising:
moveable member means operatively responsive to said on-off water flow; and
a mechanical counter communicating with said moveable member means.

3. The mechanism of claim 1 wherein the means mechanically responsive to liquid flow for totalling on-off water flow cycles is a flow meter comprising:
a barrel member with a cylindrical chamber;
a piston yieldable under pressure of liquid flow therein;
spring loading means communicating with said piston opposing the travel of said piston in response to liquid flow;
a moveable member operatively associated with said piston; and
a mechanical counter communicating with said moveable member.

4. The mechanism of claim 2 wherein the flow meter has a mechanical counter which is a ratchet drive digital counter.

5. The mechanism of claim 4 wherein the ratchet drive digital counter requires a drive shaft actuation through an arc of at least 40° to register a count.

6. The mechanism of claim 1 wherein the mechanism is a carwash, the object is a vehicle and the number of transactions is the number of cars washed.

7. The mechanism of claim 1 wherein the mechanism is a washing machine, the object is a washing machine load and the number of transactions is the number of loads washed.

* * * * *